Figure 3:
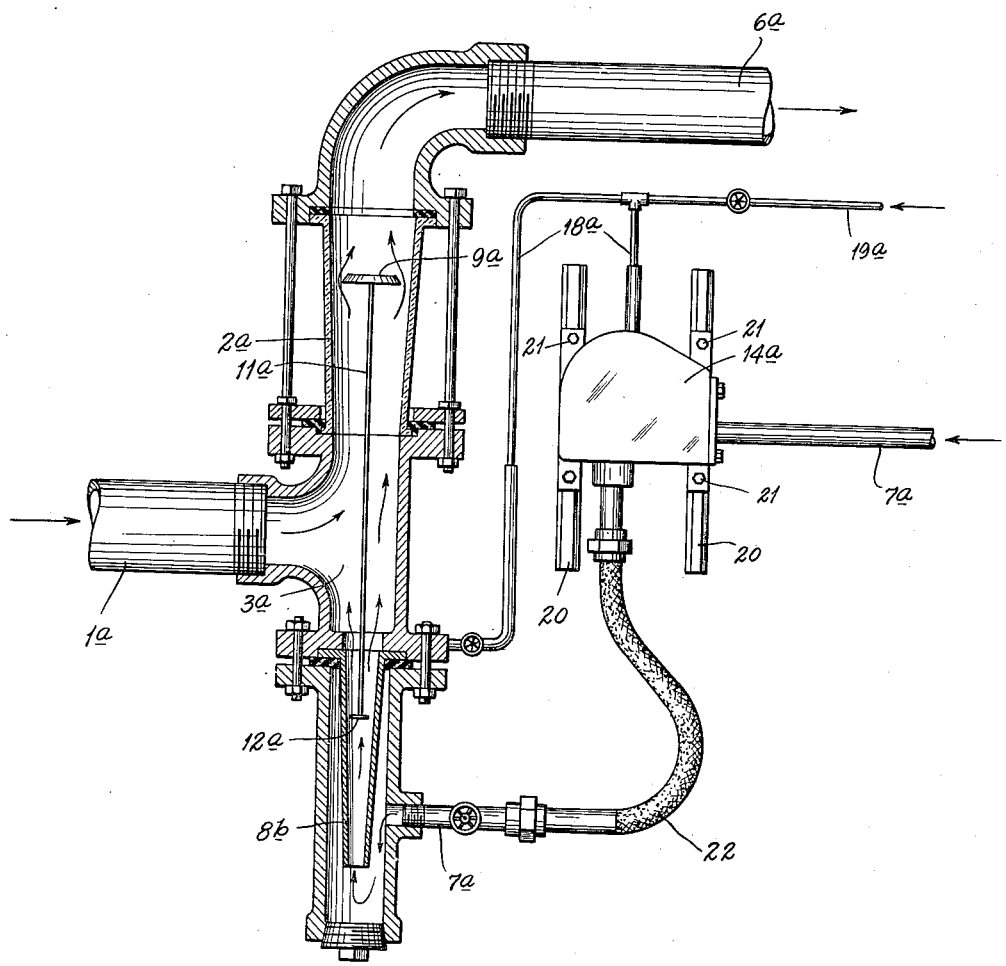

April 8, 1952     A. J. LUBELEY     2,592,304
FLUID PROPORTIONING DEVICE
Filed Aug. 18, 1945     2 SHEETS—SHEET 1
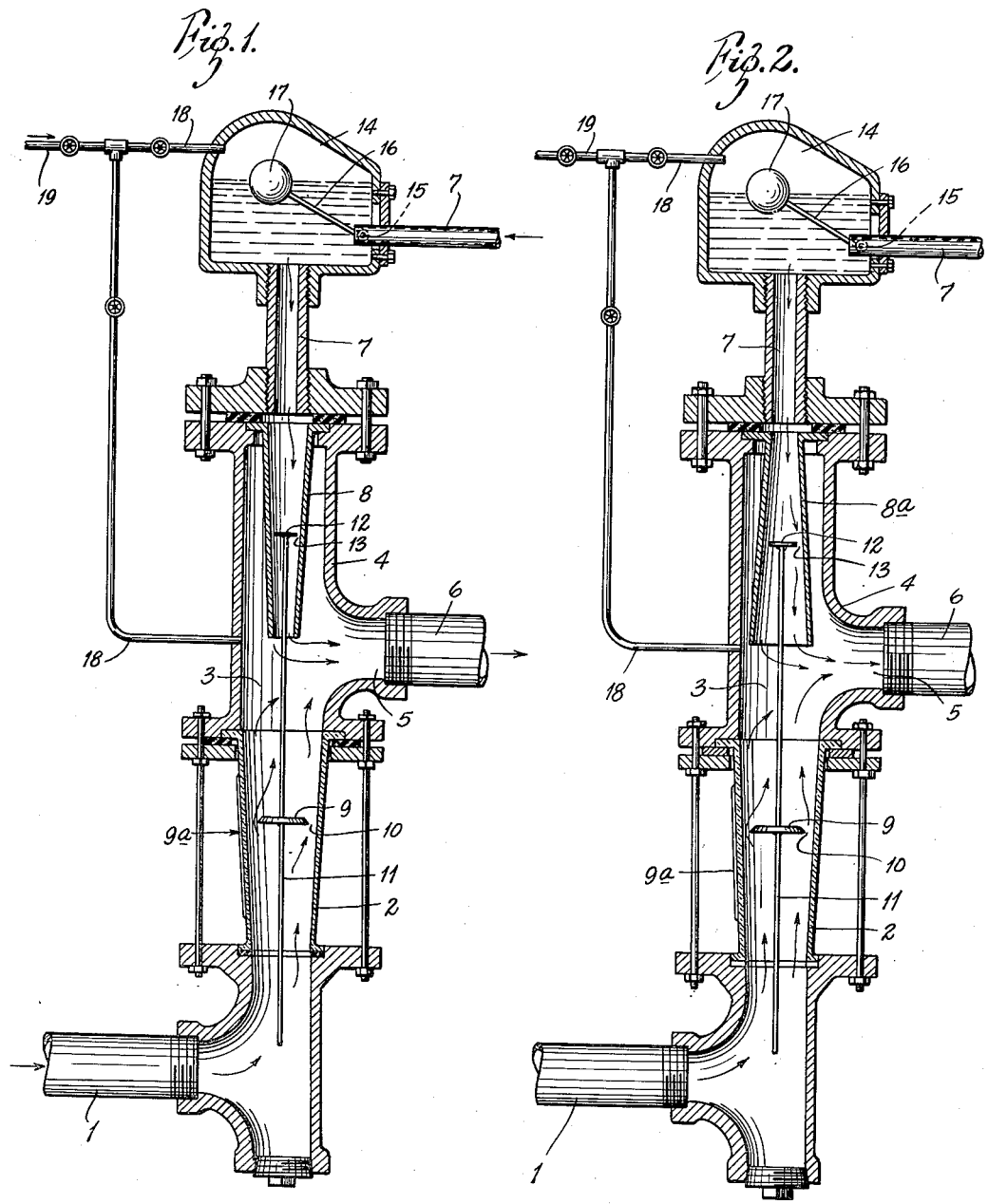
INVENTOR:
Anthony J. Lubeley,
by Carr Carr Gravely,
HIS ATTORNEYS Patented Apr. 8, 1952

2,592,304

UNITED STATES PATENT OFFICE 2,592,304

FLUID PROPORTIONING DEVICE

Anthony J. Lubeley, St. Louis, Mo., assignor to Anheuser-Busch, Inc., St. Louis, Mo., a corporation of Missouri Application August 18, 1945, Serial No. 611,391

5 Claims. (Cl. 137—165)

This invention relates to devices for proportioning the feed of one fluid into mixture with another fluid. The principal object of the present invention is to devise means responsive to the rate of flow of one fluid or that of the fluid mixture for maintaining a constant proportion or ratio of the two fluids regardless of changes in such rate of flow. Another object is to provide for changing the proportion of the two fluids. Other objects are to provide for simplicity and economy of construction and compactness of design. The invention consists in the fluid proportioning device and in the arrangements and combinations of parts hereinafter described and claimed.

In the accompanying drawings, which form part of this specification and wherein like symbols refer to like parts wherever they occur, Fig. 1 is a central longitudinal sectional view of a fluid proportional device embodying my invention, Fig. 2 is a view similar to Fig. 1 illustrating a modification of the device shown therein; and Fig. 3 is a similar view illustrating a further modification of the invention.

My fluid proportioning device comprises a pipe line or conduit 1 which leads from a suitable source of primary liquid and terminates at its discharge end in an upstanding glass tube 2 whose bore gradually increases in diameter from its lower or inlet end to its upper or outlet end where it opens into the lower end of a mixing chamber 3 formed by a fitting 4 having a lateral outlet opening 5 communicating with a discharge pipe or conduit 6 for the liquid mixture. A second pipe line or conduit 7 leads from a suitable source of secondary liquid and opens downwardly into the upper end of a tube 8 which extends downwardly into the mixing chamber 3 coaxial with the lower glass tube 2 and terminates opposite the side discharge opening 5 in said mixing chamber. The tube 8 has a bore which gradually decreases in diameter from its upper or inlet end to its lower or discharge end.

The glass tube 2 in the primary fluid line 1 forms part of a rate-of-flow indicating device including a float disk 9 which is located in said tube and cooperates therewith to form therein an annular constriction 10. The float 9 rises and falls in the glass tube 2 according to the rate of flow of the primary liquid therethrough and preferably cooperates with a suitable scale 9a marked on said tube to indicate such flow rate. The float 9 is provided with an axial rod or stem 11 that extends above and below said float. The upwardly extending portion of the float rod or stem 11 extends into the upper tube 8 through the lower end thereof and terminates within the downwardly tapering bore of said tube in a disk valve 12 or head which cooperates with said bore to form an annular restriction 13 therein which varies in area according to the vertical movement of said float in the lower glass tube 2.

In order that the secondary liquid may enter the mixing chamber 3 under a constant pressure head, said fluid first enters a chamber 14 in the secondary fluid line 7 before flowing downwardly into said mixing chamber. The secondary liquid is maintained at the desired level in the chamber 14 by means of a valve 15 which is located in the secondary fluid line on the inlet side of said chamber and is controlled by an arm 16 carrying a ball 17 which floats on the secondary liquid in the chamber 14. A pipe line 18 leads from the mixing chamber 5 at about the level of the lower or discharge end of the tube 8 therein to the float chamber 14 above the level of the secondary liquid therein. This equalizing line 18 serves to place the liquid in the float chamber 14 under the same pressure which exists in the mixing chamber 3, so that the effective pressure head, which causes the secondary liquid to flow into the mixing chamber, is represented by the vertical distance between the lower or discharge end of the secondary liquid and the level of the secondary fluid in said float chamber. In order to prevent the fluid in the mixing chamber 3 from entering the pressure equalizing line 18, a small amount of air or gas from a suitable source of pressure is introduced into said line through a pipe 19. The pressure of this air or gas is higher than that of the primary liquid, so that a small amount of gas is forced through the equalizing line 18 and escapes into the mixing chamber 3. The pressure of the secondary liquid at its source of supply must also be greater than that of the pressure of the primary liquid at its source of supply so that the secondary liquid will enter the float chamber 14 against the pressure existing therein.

The operation of the above fluid proportioning device is as follows: The primary liquid flows upwardly through the pipe line 1 into the mixing chamber 3 and the secondary liquid flows downwardly under a constant pressure head through the pipe line 7 into said mixing chamber where it mixes with the primary liquid. The liquid mixture is then discharged from the mixing chamber 3 through the lateral outlet opening 5 and discharge line 6. The primary liquid before entering the mixing chamber 3, passes through the annular constriction 10 between the float 9 and the downwardly tapering bore of the glass tube 2, whereby the rate of flow of the primary liquid determines the vertical position of said float in said tube. The metering valve 12 at the top of the float rod or stem 11 moves with the float 9 and cooperates with the tapered bore of the upper tube 8 to form an annular restriction which determines the volume of secondary liquid that enters the mixing chamber 3. Thus, a constant proportion is maintained between the two liquids despite any variation in the rate of flow of the primary liquid. At the same time, the position of the float 9 relative to the scale 9a on the transparent tube 2 in the primary liquid line 1 indicates the rate of flow of the primary liquid therethrough. If desired, the position of the float 9 may be transmitted electrically to a suitable indicating or recording instrument.

The secondary liquid enters the mixing chamber 3 under a constant pressure head determined by the level of the liquid in the float chamber 14. The mixing chamber 3 is in continuous communication through the pipe line 18 with the float chamber 14 above the level of the secondary liquid in the latter so as to equalize the static pressure in the two chambers; and the air or gas introduced into the equalizing line through the pipe 19 escapes into said mixing chamber and thus prevents the liquid therein from entering said equalizing line and perhaps spilling into the float chamber.

It is noted as an important advantage of the above liquid proportioning device that it utilizes a common type of rate-of-flow meter in the primary liquid line as a means for proportioning the feed of the secondary liquid into mixture with the primary fluid, thereby dispensing with the use of the separate independently operable proportioning devices hereinbefore employed. Another advantage of the present proportioning device is that it requires only one moving part, as distinguished from the multiplicity of parts required by previous proportioning devices.

The fluid proportioning device shown in Fig. 2 is the same as that shown in Fig. 1 except that the upper tube 8a is disposed reversely to the lower tube 2; that is, the upper tube 8a flares in the direction of flow of the secondary liquid. In this modified construction, the flow of the secondary liquid is inversely proportional to the flow of the primary liquid; that is, the volume of the secondary liquid decreases proportionately as the flow rate of the primary liquid increases.

In the modified construction shown in Fig. 3, the primary liquid line 1a opens into the mixing chamber 3a through the side thereof and the secondary liquid line 7a opens into said mixing chamber through the bottom thereof, while the discharge line 6a for the liquid mixture leads upwardly from the top of said mixing chamber. An upwardly flaring glass tube 2a forms the inlet end of the discharge line 6a and contains a float member 9a which is provided with a depending stem or rod 11a that extends downwardly through said tube and terminates its lower end in a metering valve 12a located in an upwardly flaring tube 8b which forms the discharge end of the secondary liquid line 7a.

The secondary liquid line 7a also has a float chamber 14a therein above the level of the discharge end thereof; and the level of the liquid in said chamber is also controlled by a float valve (not shown) for maintaining a uniform pressure head on the secondary fluid. The float chamber 14a is vertically slidable in guides 20 and is locked in the desired position of vertical adjustment by means of bolts 21. A portion 22 of the secondary liquid line 7a between the vertically adjustable float chamber 14a and the secondary flared tube 8a is made flexible so as to permit such adjustment of said float chamber. A pipe line 18a leads from the upper portion of the float chamber 14a to the lower or inlet end of the mixing chamber 3a so as to equalize the pressure in these two chambers; and a gas or air line 19a opens into the equalizing line. The equalizing line 18a is provided with telescopic or extensible sections to allow for vertical movement of the float chamber 14a.

The modified construction shown in Fig. 3 operates on the same principle as the construction shown in Fig. 1. In this modified construction, the primary and secondary fluids are mixed in the mixing chamber 3a, the fluid mixture passes upwardly through the upwardly flaring glass tube 2a in the mixed liquid discharge line 6a, and the float 9a in said tube responds to the rate of flow of the fluid mixture passing therethrough and actuates the metering valve 12a carried by said float to control the quantity of primary liquid that enters said mixing chamber, this quantity of the secondary liquid varying according to the rate of flow of the fluid mixture. The equalizing line 18a establishes communication between the mixing chamber 3a and the float chamber 14a, thus balancing the pressure in the two chambers; and the air supplied to the equalizing line by the line 19a serves to prevent the liquid from entering said equalizing line. The float chamber 14a may be raised and lowered at will to change the hydro-static head of the secondary liquid and thus vary the proportion between the two liquids.

Obviously, the hereinbefore described fluid proportioning device admits of considerable modification without departing from my invention. Therefore, I do not wish to be limited to the precise arrangements shown and described.

What I claim is:

1. A device for effecting a proportional addition of secondary fluid to a primary fluid, said device comprising a mixing chamber and two conduits, one for the primary fluid and the other for the secondary fluid, having a coaxial vertically disposed discharge ends opening into said mixing chamber, the discharge end of the primary fluid conduit flaring upwardly and the discharge end of the secondary fluid conduit tapering downwardly and being spaced above the discharge end of said primary fluid conduit, a float mounted in the discharge end of said primary fluid conduit and having a stem extending axially into the discharge end of the secondary fluid conduit and terminating therein in a valve, whereby said float is responsive to changes in the rate of flow of the primary fluid and said valve is movable with said float to vary the volume of secondary fluid discharged from the discharge end of said secondary fluid line to thereby maintain a constant proportionate addition of the secondary fluid to said primary fluid regardless of changes in the flow rate of the latter, said secondary fluid conduit having a second chamber therein above the level of the discharge end thereof, means for maintaining said secondary fluid at a constant level in said second chamber, a conduit communicating at one end with said mixing chamber adjacent to the discharge end of said secondary fluid conduit and at the other end with said second chamber above the level of the secondary fluid therein, and means for supplying fluid pressure to said last mentioned conduit for preventing entry therein of the fluid in said mixing chamber.

2. A device for effecting proportional mixing of a secondary fluid to a primary fluid, said device comprising a mixing chamber and three conduits, one for the primary fluid and another for the secondary fluid and still another for the mixed fluid, said conduits opening into said mixing chamber, two of said conduits having varying cross sectional areas, a float mounted in one of said conduits with a varying cross sectional area, said float having a stem extending axially into the discharge end of the other conduit with varying cross sectional area and terminating therein in a valve, whereby said float is responsive to changes in the rate of flow in said first mentioned conduit of varying cross sectional area and said valve is movable with said float for varying the volume of the fluid discharged from the discharge end of said other conduit of varying cross sectional area to thereby maintain a proportionate condition of secondary fluid to said primary fluid regardless of changes in the flow rate of the latter, said secondary fluid conduit having a second chamber therein above the level of the discharge end thereof, means for maintaining said secondary fluid at a constant level in said second chamber, a conduit communicating at one end with said mixing chamber adjacent to the discharge end of said secondary fluid conduit and at the other end with said second chamber above the level of the secondary fluid therein, and means for supplying fluid pressure to said last mentioned conduit for preventing entry therein of the fluid in said mixing chamber.

3. A device for effecting proportional mixing of a secondary fluid to a primary fluid, said device comprising a mixing chamber and two conduits, one for the primary fluid and the other for the secondary fluid, said conduits opening into said mixing chamber, and a conduit for the mixed liquid, said conduits for the primary and secondary liquids being of varying cross-sectional area, a float mounted in the discharge end of said primary fluid conduit and having a stem extending axially into the discharge end of the secondary fluid conduit and terminating therein in a valve, whereby said float is responsive to changes in the rate of flow of the primary fluid and said valve is movable with said float to vary the volume of secondary fluid discharged from the discharge end of said secondary fluid line to thereby maintain a proportionate addition of secondary fluid to said primary fluid, said secondary fluid conduit having a second chamber therein above the level of the discharge end thereof, means for maintaining said secondary fluid at a constant level in said second chamber, a conduit communicating at one end with said mixing chamber adjacent to the discharge end of said secondary fluid conduit and at the other end with said second chamber above the level of the secondary fluid therein, and means for supplying fluid pressure to said last mentioned conduit for preventing entry therein of the fluid in said mixing chamber.

4. The combination set forth in claim 2 wherein the conduits for the primary and secondary fluids flare outwardly at their discharge ends, said discharge ends opening into said mixing chamber, to thereby add the secondary fluid to said primary fluid in an inverse proportion to the rate of flow of said primary fluid.

5. The combination set forth in claim 2 wherein the conduits for the secondary and mixed fluids flare outwardly at their discharge ends, said discharge end of said secondary fluid conduit opening into said mixing chamber.

ANTHONY J. LUBELEY.

REFERENCES CITED

The following references are of record in the file of this patent:

UNITED STATES PATENTS

| Number | Name | Date |
|---|---|---|
| 1,215,129 | Edlich | Feb. 6, 1917 |
| 1,225,977 | Ledoux | May 15, 1917 |
| 1,792,757 | Parker | Feb. 17, 1931 |
| 2,002,337 | Bellum | May 21, 1935 |
| 2,004,869 | Hogg | July 11, 1935 |
| 2,065,128 | Eisinger | Dec. 22, 1936 |
| 2,371,720 | Stine | Mar. 20, 1945 |

FOREIGN PATENTS

| Number | Country | Date |
|---|---|---|
| 120,679 | Great Britain | of 1918 |
| 307,119 | Great Britain | of 1929 |